United States Patent [19]

Matsui et al.

[11] 3,954,958
[45] May 4, 1976

[54] PREPARATION OF ALUMINUM HYDRATE

[75] Inventors: Atsuro Matsui; Hidekimi Kadokura; Tadaaki Yako; Hiroshi Umezaki; Kazuo Iida, all of Niihama, Japan

[73] Assignee: Sumitomo Chemical Company, Limited, Osaka, Japan

[22] Filed: Dec. 5, 1974

(Under Rule 47)

[21] Appl. No.: 529,937

[30] Foreign Application Priority Data
Dec. 7, 1973   Japan................. 48-137934

[52] U.S. Cl............. 423/630; 260/448 A; 260/448 AD
[51] Int. Cl.²......................... C01F 7/02
[58] Field of Search............ 423/625, 628, 630; 260/448 A, 448 AD

[56] References Cited
UNITED STATES PATENTS

| | | | |
|---|---|---|---|
| 3,056,725 | 10/1962 | Rinse et al. | 423/630 |
| 3,475,477 | 10/1969 | Muller et al. | 260/448 AD |
| 3,775,456 | 11/1973 | Acciani et al. | 260/448 A |

FOREIGN PATENTS OR APPLICATIONS

| | | | |
|---|---|---|---|
| 844,637 | 8/1960 | United Kingdom | 423/625 |

*Primary Examiner*—Herbert T. Carter
*Attorney, Agent, or Firm*—Stevens, Davis, Miller & Mosher

[57] ABSTRACT

Powdery alumina hydrate is produced from an alkylaluminum compound by hydrolysis of the alkylaluminum compound by water through the following steps; converting the alkylaluminum compound to an ether complex compound: partially hydrolyzing the ether complex compound in the presence of an non-reactive solvent at a temperature of not higher than about 150°C with stirring so that no alumina hydrate is precipitated until at least 0.8 moles of water reacts with one mole of the alkylaluminum compound, thereby forming polyaluminoxane; completely hydrolyzing the resulting polyaluminoxane at a concentration of not more than about 3.0 grams-atoms as aluminum per liter of non-reactive solvent at a temperature of about 10° to about 150°C with stirring, so that one mole of the feed alkylaluminum compound may be ultimately hydrolyzed completely with 2 to 10 moles of water, thereby precipitating alumina hydrate; and then separating the resulting alumina hydrate from the non-reactive solvent. The alumina hydrate has a good forming ability and also an ability to provide formed shapes having a good mechanical strength.

17 Claims, No Drawings

PREPARATION OF ALUMINUM HYDRATE

This invention relates to a process for producing alumina hydrate, and more particularly to a process for producing powdery alumina hydrate having a good forming ability and also an ability to provide formed shapes having a good mechanical strength from alkylaluminum compounds by hydrolyzing the alkylaluminum compounds under specific conditions.

It is well known that alkylaluminum compounds, for example, trialkylaluminum, react with water to form alumina hydrate according to the following equation (1).

$$AlR_3 + 3H_2O \rightarrow Al(OH)_3 + 3RH \quad (1)$$

The reaction proceeds with evolving heat vigorously, and thus the reaction is usually carried out in the presence of an inert organic solvent such as aliphatic hydrocarbons, for example, hexane, heptane, etc., and aromatic hydrocarbons, for example, benzene, toluene, etc. However, in that case, the resulting alumina hydrate has such disadvantages as poor forming ability and poor mechanical strength of shapes formed from the alumina hydrate powders.

It is also well known from U.S. Pat. No. 3,056,725 that trialkoxyaluminum compounds are uniformly subjected to partial hydrolysis by water in the presence of an organic solvent inert to the trialkoxyaluminum compounds, such as lower alcohols, for example, ethanol, isopropanol, etc., aromatic hydrocarbons, for example, benzene, toluene, etc., and saturated aliphatic hydrocarbons, for example, hexane, heptane, etc., thereby forming polyalkoxyaluminoxane, and then the polyalkoxyaluminoxane is subjected to complete hydrolysis, thereby producing powdery alumina hydrate. However, the powdery alumina hydrate resulting from said prior art process also has such fatal disadvantages as poor forming ability and poor mechanical strength of shapes formed from the powdery alumina hydrate.

In view of these situations, the present inventors have made extensive studies of producing powdery alumina hydrate having a good forming ability and also an ability to provide formed shapes having a good mechanical strength, and as a result have recognized that in the hydrolysis of alkylaluminum compounds by water, physical properties of the resulting alumina hydrate considerably depend upon the hydrolysis conditions. On the basis of this fact, the present inventors have found that, when alkylaluminum compounds are uniformly subjected to partial hydrolysis under specific conditions, polyaluminoxane having a large mean molecular weight can be readily formed, and then when the polyaluminoxane is subjected to complete hydrolysis by water under specific conditions, powdery alumina hydrate having a good forming ability and also an ability to provide formed shapes having a good mechanical strength can be produced.

An object of the present invention is to provide a process for producing powdery alumina hydrate having a good forming ability, for example, an ability to provide an excellent formed shape when using water, and also an ability to provide formed shapes having a good mechanical strength, from alkylaluminum compounds.

That is to say, the present invention provides a process for producing powdery alumina hydrate having a good forming ability, and also an ability to provide formed shapes having a good mechanical strength from an alkylaluminum compound by hydrolysis of the alkylaluminum compound by water, which comprises converting the alkylaluminum compound to an ether complex compound, subjecting the ether complex compound uniformly to partial hydrolysis at a temperature of not higher than about 150° C in the presence of a non-reactive solvent with stirring, so that alumina hydrate may not be precipitated until at least 0.8 moles of water reacts with 1 mole of the alkylaluminum compound, thereby forming polyaluminoxane, subjecting the resulting polyaluminoxane to complete hydrolysis by 2 to 10 moles of water ultimately on the basis of 1 mole of the feed alkylaluminum compound at a temperature of about 10° to about 150°C at a concentration of not more than about 3.0 gram-atoms as aluminum per liter of a non-reactive solvent with stirring, thereby precipitating alumina hydrate, and then separating the resulting alumina hydrate from the non-reactive solvent.

Now, the present invention will be described in detail below.

The alkylaluminum compounds used in the present invention are represented by the following general formula:

wherein $R_1$ represents a hydrogen atom, an alkyl group having 1 to 8 carbon atoms or an alkoxy group having 1 to 6 carbon atoms; $R_2$ and $R_3$ represent alkyl groups having 1 to 8 carbon atoms, and include alkylaluminum compounds, for example, trialkylaluminums such as trimethylaluminum, triethylaluminum, tri-n-propylaluminum, tri-n-butylaluminum, tri-isobutylaluminum, tripentylaluminum, trihexylaluminum, trioctylaluminum, etc.; dialkylaluminum hydrides such as diethylaluminum hydride, di-n-propylaluminum hydride, di-isobutylaluminum hydride, dipentylaluminum hydride, dihexylaluminum hydride, dioctylaluminum hydride, etc.; alkoxydialkylaluminums such as ethoxydiethylaluminum, isopropoxydiethylaluminum, isopropoxydipropylaluminum, ethoxydibutylaluminum, isopropoxydibutylaluminum, butoxydibutylaluminum, hexoxydioctylaluminum, etc.; and their mixtures. From the standpoint of easy separation of the paraffin liberated by the hydrolysis, it is preferable to use triethylaluminum, triisobutylaluminum, diethylaluminum hydride, di-isobutylaluminum hydride or their mixtures.

In carrying out the present invention, the alkylaluminum compound is at first converted to a complex compound with ethers, and then the resulting ether complex compound is contacted with water in the presence of a non-reactive solvent at a temperature of not higher than about 150°C with stirring, so that substantially no alumina hydrate may be precipitated until at least 0.8 moles of water reacts with 1 mole of the alkylaluminum compound, thereby forming polyaluminoxane. In that case, it is essential that the alkylaluminum compound is made to react with water after the alkylaluminum compound has been formed into a complex compound with ethers. When the alkylaluminum compound is merely diluted with an inert solvent such as hexane, heptane, benzene, toluene, etc., and contacted with water without converting the alkylaluminum compound to the complex compound, vigorous reaction takes place locally, and alumina hydrate is precipitated before being converted to a polymeric aluminum compound. Thus, powdery alumina hydrate having a good forming ability, and also an ability to provide formed shapes having a good mechanical strength cannot be obtained.

A complex compound of an alkylaluminum compound with ethers must be present at the contact with water. That is, an alkylaluminum ether complex compound is formed in advance, and it can then be subjected to reaction. Or, the complex compound can be formed at the time of contact with water, for example, by adding the alkylaluminum compound and water separately to an ether (including a mixture with a non-reactive solvent) or by contacting the alkylaluminum compound with an ether solution containing water.

The ethers used in the present invention to form the complex compound include ether compounds having a boiling point of not higher than 175°C and an ability to form coordination compounds with the alkylaluminum compound, for example, dialkylethers such as dimethylether, diethylether, diisopropylether, di-n-propylether, diallylether, ethyl-n-propylether, methyl-n-butylether, etc., arylalkylethers such as anisole, phenetole, etc. and oxygen-containing heterocyclic compounds such as dioxane, tetrahydrofuran, dihydrofuran, furan, tetrahydropyran, etc.

In the production of the powdery alumina hydrate having a good forming ability and also an ability to provide formed shapes having a good mechanical strength, uniform partial hydrolysis of the alkylaluminum compound is very important, and no alumina hydrate should be deposited substantially until at least 0.8 moles of water reacts with one mole of the alkylaluminum compound. This can be readily attained by adding water slowly to the solution with stirring or adding ethers to be dissolving water to the solution, and is a peculiar phenomenon of the alkylaluminum complex compound.

The uniform hydrolysis of the alkylaluminum compound is generally carried out at a temperature of not higher than about 150°C, preferably about 10° to about 110°C, because conversion of the alkylaluminum compounds to polymeric ones is insufficient at a higher temperature than about 150°C, lowering the forming ability of the finally resulting alumina hydrate and the strength of the formed shapes.

The partial hydrolysis reaction under said conditions is generally shown by the following equation (2)

$$(n + 2)Al{\overset{R}{\underset{R}{\diagdown}}}R + (n + 1)H_2O$$

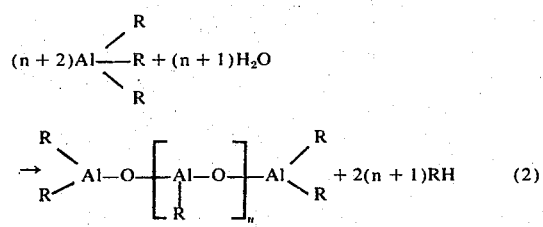

wherein R represents hydrogen atoms, alkyl groups or alkoxy groups; n is an integer.

Therefore, intermediate products formed by the partial hydrolysis are polymers comprised mainly of

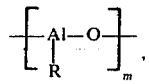

wherein R represents an alkyl group or an alkoxy group; m is an integer, but the polymers partially contain such structures as

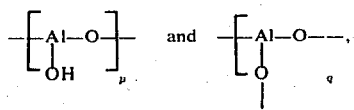

wherein p and q represent integers. The intermediate products usually are polyaluminoxanes having a mean molecular weight of 300 or more measured according to the freezing point depression method. In the present invention, it is particularly preferable that the intermediate products are polyaluminoxanes having a mean molecular weight of about 500 to about 30,000. As is apparent from the foregoing description the mean molecular weight will be lowered, if the amount of the water at the partial hydrolysis is less than 0.8 moles per mole of the alkylaluminum compound, and consequently alumina hydrate having the desired physical properties of the present invention cannot be ultimately obtained.

The polyaluminoxanes resulting from the partial hydrolysis can be subjected immediately to complete hydrolysis, or to aging, before the complete hydrolysis, to advance further conversion of polyaluminoxanes to more polymeric ones. The aging is desirable, because it assures stable production of the powdery alumina hydrate having the desired physical properties of the present invention. The aging can be carried out by keeping polyaluminoxanes at a temperature of 0° to 160°C, preferably 10° to 150°C for about 0.5 to about 10 hours.

In carrying out the present invention, the polyaluminoxanes thus prepared are completely hydrolyzed ultimately by 2 to 10 moles, preferably 2.5 to 7 moles of water (the sum total of the amount of water used in the partial hydrolysis and complete hydrolysis) per mole of the feed alkylaluminum compound at a temperature of about 10° to about 150°C at a concentration of not more than about 3.0 gram-atoms, preferably 0.5 to 2.5 gram-atoms as aluminum per liter of a non-reactive solvent, thereby depositing alumina hydrates. In that case, the reaction proceeds generally according to the following formula (3):

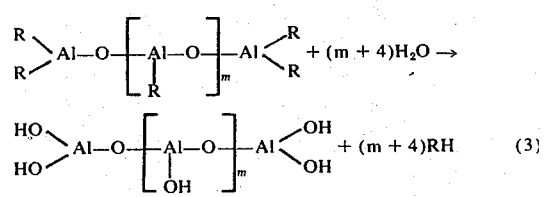

wherein R represents alkyl groups or alkoxy groups; m represents an integer. The concentration of the polyaluminoxanes in the non-reactive solvent at such a complete hydrolysis stage gives a considerable influence upon the forming ability of the resulting product and the mechanical strength of shapes formed therefrom. When the hydrolysis is carried out at a polyaluminoxane concentration of more than about 3.0 gram-atoms as aluminum per liter of non-reactive solvent, aggregation of the deposited powdery alumina hydrates proceeds considerably, and coarse grains are liable to be very much increased. Also the particle size distribution is spread widely, rendering the resulting products unsuitable for the forming.

As described above, the amount of water to be added at the stages of partial hydrolysis and complete hydrolysis is ultimately 2 to 10 moles, preferably 2.5 to 7 moles per mole of the feed alkylaluminum compound. Less than 2 moles of water is not sufficient for the complete hydrolysis, and there will remain undecomposed organic groups, which will cause foaming at the forming. On the other hand, more than 10 moles of water will aggregate the deposited alumina hydrate particles into coarser particles, and consequently only alumina hydrate having a poor forming ability and also an ability to provide formed shapes of a poor mechanical strength are produced. The complete hydrolysis is carried out by a temperature of about 10° to about 150°C, preferably about 20° to about 110°C. At a temperature lower than about 10°C, the rate of hydrolysis of the alkylaluminum compound is so considerably decreased that an industrial application is disadvantageous. On the other hand, if the temperature exceeds about 150°C, the deposited alumina hydrate particles are considerably aggregated, forming coarse particles. Consequently, only alumina hydrate having a poor forming ability and also an ability to provide formed shapes of a poor mechanical strength is produced.

At the hydrolysis of the alkylaluminum compounds (the term "hydrolysis" will be hereinafter referred to as common to both partial hydrolysis and complete hydrolysis), water can be supplied to the reaction in a liquid or gaseous state, or while being diluted with a nonreactive solvent or inert gas. From the standpoint of efficiency of reaction, water is usually used in a liquid state, and also can be supplied to the reaction continuously or discontinuously. At the stage of partial hydrolysis, the rate of water supply is controlled so that deposition of alumina hydrate does not take place and the reaction temperature does not exceed about 150°C. As the non-reactive solvent to be used at the hydrolysis for dilution of the alkylaluminum compounds, polyaluminoxanes or water to remove the heat of reaction or facilitate the reaction operation, there can be used the ethers having a boiling point of not higher than 175°C, as used in said partial hydrolysis, or inert solvents, for example, aliphatic hydrocarbons such as pentane, petroleum ether, hexane, heptane, octane, etc., alicyclic hydrocarbons such as cyclopentane, cyclohexane, cyclohexene, methylcyclohexane, ethylcyclohexane, etc., and aromatic hydrocarbons such as benzene, toluene, xylene, ethylbenzene, cumene, etc. or their mixture.

Furthermore, it is necessary to stir the reaction system at the hydrolysis to proceed the reaction as uniformly as possible, and the stirring may be a mechanical stirring by a stirrer, or can be carried out by making the reactants flow by a pump, etc.

The hydrolysis can be carried out batch-wise, semi-continuously or continuously.

In the foregoing description of the reaction, explanation has been made of the partial hydrolysis and complete hydrolysis separately to easily comprehend the present invention. However, in the practice of the present invention, the partial hydrolysis and the complete hydrolysis can be carried out separately or can be carried out continuously without separating the partial hydrolysis and the complete hydrolysis into independent steps.

In carrying out the present invention, the alumina hydrate resulting from the hydrolysis of the alkylaluminum compounds described above is then separated from the non-reactive solvent by the well known, ordinary techniques such as filtration, centrifuge, evaporation, spray drying, etc.

The powdery alumina hydrate thus obtained has such distinguished effects as a considerably good forming ability and an ability to provide formed shapes having a considerably high mechanical strength, as compared with the alumina hydrate obtained by hydrolysis of the so far well known alkylaluminum compounds or trialkoxyaluminum compounds in the presence of a non-reactive solvent such as aliphatic hydrocarbons, aromatic hydrocarbons, etc. Particularly the alumina hydrate prepared according to the conventional process is hard to form shapes and the formed shapes to be obtained only with water have a poor mechanical strength. On the other hand, when the alumina hydrate prepared according to the present invention is formed only with water, formed shapes having a good mechanical strength can be effectively formed. Even if the alumina hydrate of the present invention is formed while adding thereto an additive well known to those skilled in the art, for example, acids, bases, celluloses, etc., said effect of the present invention can be, of course, obtained.

Though it is not clear yet why the alumina hydrate having a good forming ability and also an ability to provide formed shapes having a good mechanical strength can be produced by the hydrolysis of the alkylaluminum compounds under the restricted conditions as described above, it seems firstly that the activity of the alkylaluminum compound is decreased by coordinating the alkylaluminum compound with ethers, and the reaction with water is considerably mild because of a high solubility of water in ethers, and consequently the uniform partial hydrolysis can be readily carried out, thereby readily forming higher polymerized polyaluminoxane, and secondly that powdery alumina hydrate with suitable forming characteristics, for example, suitable fine particle sizes, particle size distribution, hydrophilic propertly, etc. can be obtained by complete hydrolysis of said polyaluminoxane at the specific concentration and temperature.

The powdery alumina hydrate prepared according to the present invention can be directly utilized, or formed as it is in a hydrate form by the well-known procedure such as extrusion, granulation, compressing, etc., while utilizing its good forming ability, and the formed shapes are, if necessary, further, calcined and sintered and utilized in such well-known fields as catalysts, carrier, adsorbents, sintered materials, abrasives, coating materials, fillers, etc. or high purity powders prepared from purified raw materials can be appropriately utilized in such special fields as single crystals, jewels, specially finished abrasives, high purity sintered materials, special optical glasses, etc.

Now, the present invention will be described in detail hereunder, referring to examples, but the present invention is not limited to these examples.

EXAMPLE 1

A 50-l reactor provided with a stirrer, condenser, water trickling tube, etc. was flushed with nitrogen, and then 2.85 kg (25 moles) of triethylaluminum and 25 l (293 moles) of 1,4-dioxane were charged into the reactor. Water was continuously fed to the reactor at a rate of 150 g (8.3 moles) per hour while keeping the reactor at 50°C with stirring at 200 rpm, and the feeding of water was discontinued when 450 g (25 moles) of water was fed to the reactor. At that time, no precipitates of alumina hydrate were observed at all in the reaction system. During that period of reaction, about 400 l (16.7 moles) per hour of ethane gas was generated. A portion of the reactor content was sampled out, and 1,4-dioxane of the sample was replaced with benzene. Molecular weight of the product in the sample was measured according to a freezing point depression method, and mean molecular weight was found to be 7,000.

Then, the content of the reactor (1,4-dioxane solution containing polyaluminoxane at a concentration of 1 gram-atom as aluminum per liter of non-reactive solvent) was heated to 100°C with stirring at the same 200 rpm as mentioned above, and then water was continuously fed to the reactor at a rate of 300 g (16.7 moles) per hour under reflux of 1,4-dioxane to completely hydrolyze the polyaluminoxane. When 900 g (50 moles) of water was fed to the reactor, generation of ethane gas was hardly observed, and thus feeding of water was discontinued. For a period of from the start of the reaction to the said time of discontinuation of water feeding, total 1,800 l (75 moles) of ethane gas was generated.

Then, the solution containing the resulting alumina hydrate was heated ultimately up to 150°C under a reduced pressure to evaporate off 1,4-dioxane, and 1.85 kg of powdery alumina hydrate was obtained. Particle size distribution of the alumina hydrate was determined according to the ordinary sedimentation balance method, whereby it was found that those having particle sizes of less than 2 $\mu$ were 17% by weight, those having less than 5 $\mu$ were 58% by weight and those having less than 10 $\mu$ were 92% by weight. It was fine powders having a hydrophilic property of 1.61 g/g.

One part by weight of water was added to one part by weight of the resulting powdery alumina hydrate, and the mixture was kneaded and extruded by means of a die, 20 mm in diameter, provided with a nozzle, 3 mm in diameter. Extrusion could be carried out smoothly. The extruded rod was cut to 5-mm long pieces, and these formed pieces were dried at about 150°C and then calcined at about 1,300°C for 1 hour. The resulting formed pieces were about 2 mm in diameter and about 3.5 mm long. Further, a compressive strength of the formed pieces between plates was determined in radial direction, and it was found that a mean compressive strength of 20 pieces was 21.2 kg.

On the other hand, said powdery alumina hydrate was continuously pelletized by a rotary pan-type pelletizer, 70 cm in diameter, by spraying 1.7 parts by weight of water per one part by weight of the alumina hydrate, whereby almost truly spherical pellets having smooth surfaces, 1 to 2.5 mm in diameter, were obtained. The resulting pellets were dried and calcined in the same manner as above. The resulting calcined pellets were about 0.5 to 1.5 mm in diameter, and their compressive strength between plates was determined in the same manner as above. A mean compressive strength of 20 pellets was 6.0 kg.

EXAMPLES 2 TO 8

Various alkylaluminum compounds were converted to various ether complex compounds in the same manner as in Example 1, and then the ether complex compounds were subjected to partial hydrolysis under conditions shown in the following Table to form polyaluminoxanes. Then, aging was carried out under various conditions in Examples 2, 4, 5 and 6, whereas no aging was carried out in Examples 3, 7 and 8, and successively the resulting polyaluminoxanes were subjected to complete hydrolysis under conditions shown in the following Table to precipitate alumina hydrates. Thereupon, the reactants were heated under a reduced pressure to completely evaporate off the non-aqueous solvent, and finely powdery alumina hydrates were obtained.

The resulting alumina hydrates were formed by means of an extruder and pelletizer in the same manner as in Example 1, and their compressive strength between two plates was determined. Further the hydrophilic property of the alumina hydrates was also determined.

Various hydrolysis conditions used and the results are shown in the following Table.

COMPARATIVE EXAMPLE 1

2.85 kg (25 moles) of triethylaluminum and 25 l of heptane were charged into a reactor of the same type as used in Example 1, and water was continuously fed to the reactor at a rate of 90 g (5 moles) per hour, while keeping the reactor at 30°C with stirring at 200 rpm. At the same time when water was fed to the reactor, precipitation of alumina hydrate was observed in the reaction system, but feeding of water was continued until 450 g (25 moles) of water was fed to the reactor. At that time, feeding of water was discontinued. During a period of from the start of reaction to the discontinuation of water feeding, 140 l (5.8 moles) of ethane gas was generated. Then, the reactor was heated to 95°C and subjected to aging for 1 hour under reflux of heptane with stirring, but the generation of ethane was hardly observed during the aging.

A portion of the content was sampled out, and left standing. Then, supernatant liquid was subjected to solvent exchange, and then to determination of molecular weight according to the ordinary freezing point depression method. It was found that mean molecular weight was 210.

Then, water was continuously fed to the reactor at a rate of 300 g (16.7 moles) per hour, while keeping the reactor content at 95°C with stirring at the same 200 rpm, and when 950 g (52.8 moles) of water was fed to the reactor, the generation of ethane gas was hardly observed, and thus the feeding of water was discontinued. For a period of from the start of reaction to said discontinuation of water feeding, total 1,800 l (75 moles) of ethane gas was generated. Then, heptane was evaporated off in the same manner as in Example 1, whereby 1.88 kg of powdery alumina hydrate was obtained.

When the resulting alumina hydrate was extruded in the same manner as in Example 1, water and alumina hydrate were separated from each other, and formed shapes of original shapes were not obtained.

Further, when the alumina hydrate was pelletized according to the same pelletizing method as in Example 1, growth of seeds fails to take place, and pellets having diameters of over 0.5 mm were not obtained at all.

COMPARATIVE EXAMPLES 2 TO 9

Alkylaluminum compounds were converted to their ether complex compounds (no complex compounds were prepared in Comparative Examples 8 and 9), and then subjected to hydrolysis under conditions shown in the following Table to precipitate alumina hydrates. Then, the reactors were heated under a reduced pressure to completely evaporate off non-reactive solvents and alumina hydrates were obtained.

The resulting alumina hydrates were formed by extrusion and pelletizing in the same manner as in Example 1, and their compressive strength between two plates were measured. Further, hydrophilic property of these powdery alumina hydrates was measured in the same manner as in Example 1.

Various hydrolysis conditions used, and results of determination of physical properties of the alumina hydrates are shown in the following Table.

Table

| Items Raw material | Examples | | | | | | | |
|---|---|---|---|---|---|---|---|---|
| | 1 | 2 | 3 | 4 | 5 | 6 | 7 | 8 |
| Alkylaluminum compounds | Triethyl-aluminum | Triethyl-aluminum | Triethyl-aluminum | Triethyl-aluminum | Triiso-butyl-aluminum | Trioctyl-aluminum | Diiso-butyl-aluminum hydride | Isopropoxy-diethyl-aluminum |
| Kg (mole) | 2.85 (25) | 8.00 (70) | 2.85 (25) | 6.27 (55) | 4.95 (25) | 9.00 (25) | 3.55 (25) | 3.6 (25) |
| Ethers | 1,4-dioxane | 1,4-dioxane | Tetrahydrofuran | Diethylether | 1,4-dioxane | Phenetole | Di-n-butylether | Diisopropylether |
| liter (mole) | 25 (293) | 35 (411) | 5 (62) | 25 (242) | 12.5 (147) | 25 (198) | 12.5 (74) | 5 (35) |
| Hydrolysis and aging conditions Partial hydrolysis | | | | | | | | |
| Added solvent (l) | — | — | — | — | — | — | Octane (7.5) | Hexane (20) |
| Trickled water concentration (wt %) | 100 | 100 | 10 | 100 | 20 | 100 | 100 | 100 |
| Water feed rate (g/hr) | 150 | 100 | 150 | 200 | 150 | 220 | 125 | 150 |
| Amount of water fed (g) | 450 | 1300 | 450 | 1000 | 450 | 440 | 500 | 450 |
| (1) Water/alkylaluminum compound (molar ratio) | 1.0 | 1.0 | 1.0 | 1.0 | 1.0 | 1.0 | 1.1 | 1.0 |
| Temperature (°C) | 50 | 20 | 65 | 35 | 100 | 130 | 100 | 65 |

| | Comparative Examples | | | | | | | | |
|---|---|---|---|---|---|---|---|---|---|
| | 1 | 2 | 3 | 4 | 5 | 6 | 7 | 8 | 9 |
| Alkylaluminum compound | Triethyl-aluminum | Triethyl-aluminum | Triethyl-aluminum | Triethyl-aluminum | Triethyl-aluminum | Triiso-butyl-aluminum | Triethyl-aluminum | Triisopropoxy-aluminum | Triisopropoxy-aluminum |
| Kg (mole) | 2.85 (25) | 2.85 (25) | 2.85 (25) | 8.00 (70) | 2.85 (25) | 4.95 (25) | 3.42 (30) | 4.08 (20) | 4.08 (20) |
| Ethers | — | Diisopropylether | Phenetole | 1,4-dioxane | Diethylether | Tetrahydrofuran | Phenetole | Diethylether | — |
| liter (mole) | — | 20 (142) | 12.5 (99) | 20 (235) | 12.5 (121) | 20 (247) | 10 (79) | 20 (194) | — |
| Added solvent (l) | Heptane (25) | — | Decane (12.5) | — | Pentane (12.5) | — | — | — | Isopropanol (20) |
| Trickled water concentration (wt %) | 100 | 100 | 100 | 20 | 100 | 20 | 100 | 100 | 1 |
| Water feed rate (g/hr) | 90 | 100 | 150 | 200 | 150 | 150 | 180 | 51 | 5.1 |
| Amount of water fed (g) | 450 | 300 | 450 | 1300 | 450 | 450 | 540 | 360 | 360 |
| (1) Water/alkylaluminum compound (molar ratio) | 1.0 | 0.67 | 1.0 | 1.0 | 1.0 | 1.0 | 1.0 | 1.0 | 1.0 |
| Temperature (°C) | 30 | 50 | 173 | 100 | 35 | 65 | 120 | 30 | 82 |
| Hydrolysis and aging conditions | | | | | | | | | |
| Precipitation of alumina hydrate | none | none | none | none | none | none | none | none | none |
| Aging time (hr) | — | 3 | — | 1 | 2 | 2 | — | — | — |
| Aging temperature (°C) | — | 100 | — | 35 | 100 | 125 | — | — | — |
| Mean molecular weight | 7000 | 18000 | 10500 | 8500 | 9500 | 6000 | 3000 | 500 | |
| Complete hydrolysis | | | | | | | | | |
| Polyaluminoxane concentration (gram-atom/l) | 1.0 | 1.5 | 1.0 | 2.2 | 1.0 | 0.76 | 1.25 | 1.0 | |
| Added solvent (l) | — | 1,4-dioxane (12) | Tetrahydrofuran (20) | — | Toluene (12.5) | Octane resulting from partial hydrolysis (7.5) | — | — | |
| Trickled water concentration (wt %) | 100 | 100 | 100 | 100 | 100 | 100 | 100 | 100 | |
| Water feed rate (g/hr) | 300 | 400 | 300 | 500 | 300 | 500 | 260 | 300 | |
| Amount of water fed (g) | 900 | 2700 | 900 | 2000 | 900 | 2700 | 1300 | 900 | |
| (2) Water/alkylaluminum compound (molar ratio) | 2.0 | 2.1 | 2.0 | 2.0 | 2.0 | 6.0 | 2.9 | 2.0 | |
| Temperature (°C) | 100 | 100 | 25 | 35 | 100 | 50 | 125 | 65 | |
| (3) Total water used/alkylaluminum compound (molar ratio) | 3.0 | 3.1 | 3.0 | 3.0 | 3.0 | 7.0 | 4.0 | 3.0 | |
| | yes | none | yes | none | none | none | none | yes | Slightly yes |
| | 1 | 2 | — | 2 | — | — | — | 1 | 1 |
| | 95 | 50 | — | 50 | — | — | — | 30 | 82 |
| | 210 | 200 | 160 | 13500 | 5500 | 9000 | 2500 | 260 | 950 |
| | 1.0 | 1.25 | 1.0 | 3.5 | 1.0 | 1.0 | 1.5 | 0.93 | 0.89 |

Table -continued

| Items Raw material | Examples | | | | | | | |
|---|---|---|---|---|---|---|---|---|
| | 1 | 2 | 3 | 4 | 5 | 6 | 7 | 8 |
| | — | — | — | — | Tetrahydrofuran (5) | Decane (10) | Isopropanol resulting from partial hydrolysis (1.5) | Isopropanol resulting from partial hydrolysis (2.6) |
| | 100 | 100 | 100 | 20 | 100 | 100 | 20 | 100 | 30 |
| | 300 | *1050 | 300 | 400 | 225 | 600 | 600 | 180 | 180 |
| | 950 | 1050 | 900 | 2700 | 225 | 6300 | 2160 | 720 | 720 |
| | 2.1 | 2.33 | 2.0 | 2.1 | 0.5 | 14.0 | 4.0 | 2.0 | 2.0 |
| | 95 | 68 | 120 | 100 | 35 | 35 | 173 | 30 | 82 |
| | 3.1 | 3.0 | 3.0 | 3.1 | 1.5 | 15.0 | 5.0 | 3.0 | 3.0 |
| Physical properties | | | | | | | | |
| State of powders | Fine powders | Fine powders | Fine powders | Fine powders | Fine powders | Fine powders | Fine powders | Fine powders |
| (5) Extrusion forming ability | good | good | good | good | good | good | good | good |
| Compressive strength of extrusion-formed shapes (kg/cm²) | 21.2 | 27.7 | 23.1 | 22.7 | 20.7 | 14.1 | 8.3 | 7.0 |
| (5) Pelletizing forming ability | good | good | good | good | good | good | good | good |
| Compressive strength of pelletizing-formed shapes (kg/cm²) | 6.0 | 8.3 | 6.1 | 6.0 | 7.5 | 3.5 | 2.7 | 2.4 |
| (4) Hydrophilic property (g/g powder) | 1.61 | 1.73 | 2.30 | 1.40 | 1.58 | 1.67 | 1.27 | 1.29 |
| | Coarse grains | Coarse grains | Fine powders | Coarse grains | Coarse grains | Coarse grains | Coarse grains | Coarse grains |
| | Impossible | Poor | Poor | Poor | Poor (bubbled) | Poor | Poor | Poor | Poor |
| | — | 1.2 | 1.5 | 0.8 | 0.5 | 1.7 | 2.2 | 1.1 | 1.8 |
| | Impossible | Poor | Poor | Poor | Poor (bubbled) | Poor | Poor | Poor | Poor |
| | — | 0.2 | 0.4 | 0.1 | 0.1 | 0.3 | 0.9 | 0.1 | 0.3 |
| | 0.51 | 0.82 | 0.68 | 0.10 | — | 1.02 | 0.48 | 0.42 | 0.55 |

*Alumina hydrate was precipitated at the same time when water was added. That is, precipitation took place before the molar ratio of water/alkylaluminum compound reached 0.8.

Notes to Table:
(1): Molar ratio of water fed to the partial hydrolysis to raw material alkylaluminum
(2): Molar ratio of water fed to the complete hydrolysis to raw material alkylaluminum
(3): Molar ratio of sum total of water used in both partial hydrolysis and complete hydrolysis to raw material alkylaluminum
(4): Ratio of weight of water absorbed (g) to weight of packed powdery alumina hydrate (g) determined according to a capillary elevation method [Jikken Kagaku Koza, Vol. 7, Kaimen Kagaku, page 80, published by Maruzen Co., (1959)]
(5): Forming ability
Impossible: As to the extrusion forming ability, water and alumina hydrate were separated from each other even when extruded, and thus the extrusion was impossible to effect. As to pelletizing-forming ability, no seeds were generated even when pelletized, or seeds, when generated, failed to grow, and thus the pelletizing was impossible to effect.
Poor: Extrusion and pelletizing were very difficult to effect, and even when it was possible, the formed shapes had a considerably low mechanical strength.

In Comparative Example 1, where no ethers, etc., were used, or Comparative Examples 2, 5 and 6, where less than 0.8 moles of water was used in the partial hydrolysis, or less than 2 moles or more than 10 moles of water was used ultimately at the completion of the entire reaction per mole of the alkylaluminum compound, or Comparative Example 3, where the temperature at the partial hydrolysis exceeded 150°C, or Comparative Example 4, where the concentration at the complete hydrolysis exceeded 3.0 gram-atoms as aluminum per liter of solvent, or Comparative Example 7, where the temperature exceeded 150°C, or Comparative Examples 8 and 9, where trialkoxyaluminum was used as the raw material, no seeds grew even when pelletized, owing to the low degree of polymerization or larger amount of aggregated particles, or water and alumina hydrate were separated from each other, even when extruded, and the extrusion was thus failed, or even if it was possible to effect forming, the resulting formed shapes had a considerably low mechanical strength, as is apparent from the Table. Thus, powdery alumina hydrates having a poor forming ability and an ability to provide formed shapes of inferior mechanical strength were only produced in these Comparative Examples.

What is claimed is:

1. A process for producing a powdery alumina hydrate from an alkylaluminum compound by hydrolysis by water, which comprises reacting an alkylaluminum compound having the general formula:

wherein $R_1$ represents a hydrogen atom, alkyl group having 1 to 8 carbon atoms or alkoxy group having 1 to 6 carbon atoms, $R_2$ and $R_3$ represent alkyl groups having 1 to 8 carbon atoms with an ether to form an ether complex compound,
said ether being an ether compound having a boiling point of not more than 175°C and an ability to form a coordination compound with an alkylaluminum compound;
partially hydrolyzing the ether complex compound in the presence of a non-reactive solvent selected from the group consisting of ethers having a boiling point of not higher than 175°C as were capable of use in the partial hydrolysis, aliphatic hydrocarbons, alicyclic hydrocarbons, aromatic hydrocarbons and mixtures thereof at a temperature of not higher than about 150°C with stirring, while preventing precipitation of alumina hydrate until at least 0.8 moles of water reacts with one mole of the alkylaluminum compound, thereby forming polyaluminoxane;

completely hydrolyzing the formed polyaluminoxane at a concentration of not more than about 3.0 gram-atoms as aluminum per liter of said non-reactive solvent at a temperature of from about 10° to about 150°C with stirring, thereby completely hydrolyzing ultimately 1 mole of the feed alkylaluminum compound with 2 to 10 moles of water to precipitate alumina hydrate; and separating the resulting alumina hydrate from said non-reactive solvent.

2. A process according to claim 1, wherein the alkylaluminum compound is at least one of trimethylaluminum, triethylaluminum, tri-n-propylaluminum, tri-n-butylaluminum, tri-isobutylaluminum, tripentylaluminum, trihexylaluminum, trioctylaluminum, diethylaluminum hydride, di-n-propylaluminum hydride, di-isobutylaluminum hydride, dipentylaluminum hydride, dihexylaluminum hydride, dioctylaluminum hydride, ethoxydiethylaluminum, isopropoxydiethylaluminum, isopropoxydipropylaluminum, ethoxydibutylaluminum, isopropoxydibutylaluminum, butoxydibutylaluminum and hexoxydioctylaluminum.

3. A process according to claim 1, wherein the ether is dimethylether, diethylether, diisopropylether, di-n-propylether, diallylether, ethyl-n-propylether, methyl-n-butylether, anisole, phenetole, dioxane, tetrahydrofuran, dihydrofuran, furan, or tetrahydropyran.

4. A process according to claim 1, wherein the partial hydrolysis is carried out by slowly adding water with stirring.

5. A process according to claim 1, wherein the partial hydrolysis is carried out by adding ether containing water in a solution state.

6. A process according to claim 1, wherein the partial hydrolysis is carried out at a temperature of from about 10° to about 110°C.

7. A process according to claim 1, wherein the polyaluminoxane has a mean molecular weight of not less than 300.

8. A process according to claim 7, wherein the polyaluminoxane has a mean molecular weight of from about 500 to about 30,000.

9. A process according to claim 1, wherein the polyaluminoxane is subjected to aging before the complete hydrolysis.

10. A process according to claim 9, wherein the aging is carried out at a temperature of from 0° to 160°C for about 0.5 to about 10 hours.

11. A process according to claim 1, wherein the complete hydrolysis is carried out at a concentration of 0.5 to 2.5 gram-atoms as aluminum per liter of the non-reactive solvent.

12. A process according to claim 1, wherein one mole of the feed alkylaluminum compound is hydrolyzed ultimately with 2.5 to 7 moles of water.

13. A process according to claim 1, wherein the complete hydrolysis is carried out at a temperature of from about 20° to about 110°C.

14. A process according to claim 1, wherein the water is supplied in a liquid state.

15. A process according to claim 14, wherein the water is supplied continuously.

16. A process according to claim 14, wherein the water is supplied discontinuously.

17. A process according to claim 1, wherein the non-reactive solvent is dimethylether, diethylether, diisopropylether, di-n-propylether, diallylether, ethyl-n-propylether, methyl-n-butylether, anisole, phenetole, dioxane, tetrahydrofuran, dihydrofuran, furan, tetrahydropyran, pentane, hexane, heptane, octane, cyclopentane, cyclohexane, cyclohexene, benzene, toluene, xylene, petroleum ether, ethylbenzene, cumene, methylcyclohexane or ethylcyclohexane.

* * * * *